(12) United States Patent
Lopez Mendez et al.

(10) Patent No.: US 11,436,804 B2
(45) Date of Patent: Sep. 6, 2022

(54) AUGMENTED REALITY SYSTEM

(71) Applicant: Arm Limited, Cambridge (GB)

(72) Inventors: Roberto Lopez Mendez, Cambridge (GB); Daren Croxford, Swaffham Prior (GB); Ioan-Cristian Szabo, Cambridge (GB); Mina Ivanova Dimova, Great Shelford (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/897,596

(22) Filed: Jun. 10, 2020

(65) Prior Publication Data

US 2021/0390777 A1 Dec. 16, 2021

(51) Int. Cl.
| | |
|---|---|
| *G06T 15/00* | (2011.01) |
| *G06T 19/00* | (2011.01) |
| *G06T 17/00* | (2006.01) |
| *G06T 7/10* | (2017.01) |
| *G06V 20/20* | (2022.01) |

(52) U.S. Cl.
CPC .............. *G06T 19/006* (2013.01); *G06T 7/10* (2017.01); *G06T 17/00* (2013.01); *G06V 20/20* (2022.01); *G06T 2207/10028* (2013.01); *G06T 2207/20084* (2013.01)

(58) Field of Classification Search
CPC .. G06T 2207/20076; G06T 7/579; G06T 7/80
USPC ......................................... 345/418
See application file for complete search history.

(56) References Cited

U.S. PATENT DOCUMENTS

| | | | | |
|---|---|---|---|---|
| 10,553,026 | B2 * | 2/2020 | Yan | G06T 7/586 |
| 10,655,962 | B2 * | 5/2020 | Siercks | G01S 19/13 |
| 10,817,050 | B2 * | 10/2020 | Iyer | G06F 3/012 |
| 10,922,831 | B2 * | 2/2021 | Iyer | G06T 7/579 |
| 2020/0279121 | A1 * | 9/2020 | Stanimirovic | G06K 9/2018 |

(Continued)

OTHER PUBLICATIONS

De Amicis R, Bernstein WZ, Scholz J, Radkowski R, Simões B, Lieberman J, Prather E. Merging Geospatial Technologies with Cross Reality in the context of smart manufacturing systems. In 2020 IEEE International Symposium on Mixed and Augmented Reality Adjunct (ISMAR-Adjunct) Nov. 9, 2020 (pp. 333-337). IEEE.*

(Continued)

*Primary Examiner* — Phu K Nguyen
(74) *Attorney, Agent, or Firm* — EIP US LLP

(57) ABSTRACT

An AR system is provided, the AR system including one or more sensors, storage, one or more communications modules, and one or more processors. The one or more sensors generate sensed data representing at least part of an environment in which the AR system is located. The one or more communications modules transmit localization data to be used in determining the location and orientation of the AR system. The one or more processors are arranged to obtain sensed data representing an environment in which the AR system is located, process the sensed data to identify a first portion of the sensed data which represents redundant information, derive localization data, wherein the localization data is derived from the sensed data and the first portion is obscured during the derivation of the localization data, and transmit at least a portion of the localization data using the one or more communication modules.

20 Claims, 6 Drawing Sheets

(56) References Cited

U.S. PATENT DOCUMENTS

| | | | |
|---|---|---|---|
| 2020/0410759 A1* | 12/2020 | Murphy-Chutorian | ................... G06T 19/006 |
| 2021/0056764 A1* | 2/2021 | Lacey | ................. G06F 3/017 |

OTHER PUBLICATIONS

Sun Y, Kantareddy SN, Bhattacharyya R, Sarma SE. X-vision: An augmented vision tool with real-time sensing ability in tagged environments. In2018 ieee international conference on rfid technology & application (rfid-ta) Sep. 26, 2018 (pp. 1-6). IEEE.*

Perdices E, Cañas JM. SDVL: Efficient and accurate semi-direct visual localization. Sensors. Jan. 2019;19(2):302.*

Bescos B, Fácil JM, Civera J, Neira J. DynaSLAM: Tracking, mapping, and inpainting in dynamic scenes. IEEE Robotics and Automation Letters. Jul. 26, 2018;3(4):4076-83.*

Ahmadyan et al, Real-Time 3D Object Detection on Mobile Devices with MediaPipe, Google AI Blog, Mar. 11, 2020;https://ai.googleblog.com/2020/03/real-time-3d-object-detection-on-mobile.html.*

Melad, Nathaniel. "Detecting and Blurring Potentially Sensitive Personal Information Containers in Images Using Faster R-CNN Object Detection Model with TensorFlow and OpenCV." (2019).*

Speciale et al., "Privacy Preserving Image-Based Localization", Mar. 13, 2019, https://arxiv.org/pdf/1903.05572.pdf.

* cited by examiner

AUGMENTED REALITY SYSTEM

BACKGROUND OF THE INVENTION

Field of the Invention

The present disclosure relates to augmented reality (AR) systems. The invention has particular, but not exclusive, relevance to the security of data used in determining the location and orientation of the AR system.

Description of the Related Technology

AR devices provide experiences to users in which a representation of a real-world environment is enhanced by computer-generated perceptual information. In order to accurately provide these experiences to users, the position and orientation of the AR device is determined so that the computer-generated perceptual information can be integrated seamlessly into the representation of the real world. An alternative term for AR is "mixed-reality", which references the merging of real and virtual worlds.

Enhancing the real-world environment by computer-generated perceptual information may comprise the use of perceptual information that covers one or more sensory modalities including, for example, visual (in the form of images, which could be text or simple icons in some cases), auditory (in the form of audio), haptic (in the form of touch), somatosensory (relating to the nervous system), and olfactory (relating to the sense of smell) information.

Overlaying the sensory information on to the real-world (or "physical") environment can be done constructively (by adding to the natural environment) or destructively (by subtracting from, or masking, the natural environment). AR thus alters a user's perception of their real-world environment, while virtual reality (VR) replaces their real-world environment with an entirely simulated (i.e. computer-generated) one.

AR devices include, for example, AR enabled smart telephones, AR enabled mobile computers such as tablet computers, and AR headsets including AR glasses. The position and orientation of an AR device, relative to an environment in which it is located, are generally determined based on sensor data collected by the AR device or associated with the AR device through a process of localization.

SUMMARY

According to a first aspect of the present disclosure, there is provided an augmented reality, AR, system comprising: one or more sensors arranged to generated sensed data representing at least part of an environment in which the AR system is located; storage for storing sensed data generated by the one or more sensor; one or more communications modules for transmitting localization data to be used in determining the location and orientation of the AR system; and one or more processors arranged to: obtain sensed data representing an environment in which the AR system is located; process the sensed data to identify a first portion of the sensed data which represents redundant information; derive localization data for use in determining a location and orientation of the AR system, wherein the localization data is derived from the sensed data and the first portion is obscured during the derivation of the localization data; and transmit at least a portion of the localization data using the one or more communication modules.

According to a second aspect of the present disclosure, there is provided a computer-implemented method of data processing for an augmented reality, AR, system, the method comprising: obtaining sensed data representing an environment in which the AR system is located; processing the sensed data to identify a first portion of the sensed data which represents redundant information; deriving localization data for use in determining a location and orientation of the AR system, wherein the localization data is derived from the sensed data and the first portion is obscured during the derivation of the localization data; and transmitting at least a portion of the localization data.

According to a third aspect of the present disclosure there is provided a non-transitory computer-readable storage medium, comprising computer-readable instructions which, when executed by at least one processor, cause the at least one processor to: obtain sensed data representing an environment in which an augmented reality, AR, system is located; process the sensed data to identify a first portion of the sensed data which represents redundant information; derive localization data for use in determining a location and orientation of the AR system, wherein the localization data is derived from the sensed data and the first portion is obscured during the derivation of the localization data; and transmit at least a portion of the localization data.

DETAILED DESCRIPTION OF CERTAIN INVENTIVE EMBODIMENTS

Figure 1:
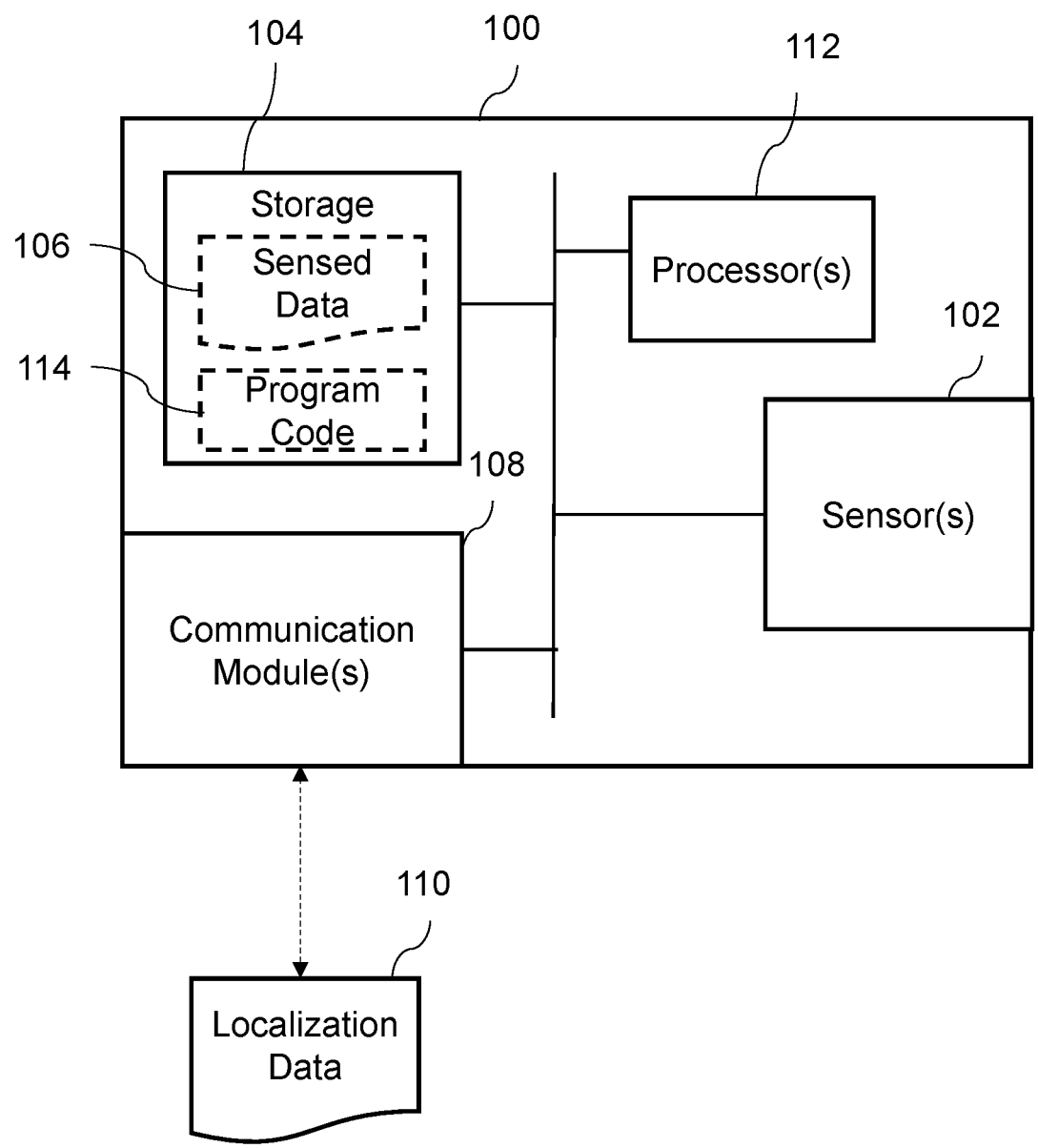
FIG. 1 is a schematic diagram of an AR system according to examples.

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily other examples. It should be further noted that certain examples are described schematically with certain features omitted and/or necessarily simplified for ease of explanation an understanding of the concepts underlying the examples.

Systems and methods relating to data processing in the context of augmented reality (AR) systems are described herein. AR systems provide augmented reality experiences to users in which virtual objects, which may comprise perceptual information, are used to augment a representation, or a perception of, a real-world environment. A representation of the real-world environment may comprise sensor-originated data, which may also be referred to as sensed data, corresponding to one or more sensory modalities, e.g. visual (in the form of images data), auditory (in the form of audio data), touch (in the form of haptic data), nervous (in the form of somatosensory data), and smell (in the form of olfactory data).

The sensed data may be representative of a physical quantity measurable by a sensor. A sensor may be a device configured to measure a physical quantity, such as light, depth, motion, sound, etc. and convert it into a signal, e.g. an electrical signal. Examples of sensors include image sensors, tactile sensor, motion sensors, depth sensors, microphones, sound navigation and ranging (Sonar) devices, light detection and ranging (LiDAR) devices, radio azimuth detection and ranging (RADAR), global position system, GPS, sensors, and sensors included in inertial measurement units (IMUS) such as accelerometers, gyroscopes, and in some cases magnetometers. For example, an image sensor may convert light into a digital signal. Image sensors include image sensors which operate in the visible light spectrum, but may additionally, or alternatively, include image sensors which operate outside of the visible spectrum, for example the infrared spectrum. The sensed data associated with an image captured by a sensor may therefore comprise image data representative of an image captured by the sensor. However, in other examples the sensed data may additionally or alternatively comprise audio data representative of a sound (e.g. measurable by a microphone), or another kind of sensor-originated data representative of a difference physical quantity (e.g. haptic, somatosensory or olfactory data) measurable by a corresponding type of sensor. Sensed data may be source data, or "raw data", output directly from a sensor (e.g. sensor data) in some cases. In such cases, the sensed data may be obtained from a sensor, e.g. by direct transfer of the data or by reading the data from intermediate storage on which the data is stored. In other cases, the sensed data may be preprocessed: for example, further processing may be applied to the sensed data after it has been obtained by the sensor and before it is processed by a processor. In some examples, the sensed data comprises a processed version of the sensor data output by the sensor. For example, the raw sensory input may be processed to transform low-level information into higher-level information (e.g. extracting shapes from images for object recognition).

To provide AR experiences, the location and orientation of an AR system within a real-world environment is determined by a process of localization. Determining the location and orientation of the AR system allows virtual objects to be integrated into a representation of the real-world accurately such that a user of the AR system experiences an immersive integration of the real-world and the virtual enhancements. The location and orientation of an AR system may be collectively referred to as a "geopose", or "geographically anchored pose", which represents the spatial location of the AR system and the orientation, or "pose", of the AR system specifying the pitch, roll, and yaw according to a coordinate system.

To determine the position and orientation of an AR system, localization data may be processed to determine the relative position of the AR system within the environment. Localization data may be derived from sensed data, which provides information representing the environment in which the AR system is located and/or information relating to the orientation and/or motion of the AR system. For example, portions of image data, generated from an image sensor included in an AR system, may be selected for inclusion in the localization data. Alternatively, or additionally, the image data may be processed to identify a set of feature points and build feature descriptors, which encode information relating to the feature points, enabling them to be differentiated. These feature points and descriptors are used to identify objects and structures within an environment so that the relative position of the AR system can be determined. Localization data may be derived from a plurality of types of sensed data generated by different sensors. For example, image data or data representing a set of feature points and descriptors may be used in combination with motion data generated from an inertial measurement unit during localization, to accurately identify and track the location and orientation of a AR system as it moves through a real-world environment. Alternatively, or additionally, image data may be supplemented by depth information, generated by depth sensors or derived from LiDAR, RADAR, and other outputs, to identify the relative positions of objects in an image represented by the image data.

As AR services and systems become more prevalent, there is a desire for AR experiences to persist across a plurality of device types, operating systems, and over time. To this end, AR experiences may be stored, and certain AR functions implemented by, a remote system such as an AR cloud implemented by one or more remote computing devices. The AR cloud may comprise, or implement, a real-time spatial (i.e. "three-dimensional" or "3D"), map of the real world, for example, in the form of a point cloud. One such AR function which may be performed by an AR cloud is localization. In this case, AR systems arranged to provide AR experiences to users provide localization data to the AR cloud and the AR cloud determines the location and orientation of the AR system based on the localization data and the real-time spatial map of the real world. In other examples, an AR cloud may comprise, or implement, a real-time spatial map of specific parts of a real-world environment. Positional data (or "geopose data"), representing the location and orientation of the AR system with respect to the environment may then be provided to the AR system by the AR cloud.

Although some AR systems are capable of performing localization without the use of a remote system, for example, AR systems which are arranged to perform simultaneous localization and mapping (SLAM) may be able to provide AR experiences without transmitting data to the AR cloud, performing localization of the AR device may be computationally expensive. Localization is a challenge for AR applications which execute on AR systems which are mobile computing devices, such as general-purpose smartphones and general-purpose tablet computing devices, which have relatively small amounts of available computing resources and/or power.

In this way, performing certain AR functions remotely from the AR system may allow data storage and processing performed by the AR system to be kept to a necessary minimum, allowing the AR system to have a size, weight, and form factor that are practical and attractive for prolonged use and/or everyday use of the AR system.

Performing localization of AR systems in a remote computing device, for example one or more servers implementing an AR cloud, may also allow the relative positions of multiple AR systems in the environment to be determined and related when providing AR experiences using the multiple AR systems.

Certain examples described herein relate to an AR system which is arranged to provide localization data to one or more external computing devices to determine a location and orientation of the AR system. The localization data is derived from sensed data, generated by sensors of the AR system, and portions of the sensed data which represent redundant information are obscured when deriving the localization data. The redundant information includes information which is not to be used when determining the location and orientation of the AR system, for example, sensitive information. Obscuring the first portion of data is performed in such a way that localization data which is transmitted to one or more remote computing devices may not be used to determine redundant information captured by the one or more sensors. For example, obscuring the first portion may include modifying the first portion or in some cases, excluding, or "removing", the first portion when deriving the localization data. In either case, the obscuring the first portion is done such that it is not possible to determine the redundant information from the localization data, for example, by reverse engineering the localization data.

FIG. 1 shows an example of an AR system 100 which may be embodied as a single device, such as an AR enabled smart telephone or an AR headset. Alternatively, the AR system 100 may be implemented by multiple devices which may be communicatively coupled via wired or wireless means. For example, an AR device such as a mobile computer or an AR enabled smart telephone which is in communication with one or more AR accessories such as an AR headset.

The AR system 100 includes one or more sensors 102 arranged to generate sensed data representing at least part of an environment in which the AR system 100 is located. The one or more sensors 102 include one or more cameras for generating image data representing part of the environment falling within a field of view of the one or more cameras. The field of view may be delimited in the vertical and/or horizontal directions, depending on the number and location of the cameras. For example, the cameras may be arranged to face in substantially the same direction as the head of a user, for example where the user is wearing an AR headset, in which case the field of view of the one or more cameras may include a whole or part of the user's field of vision. Alternatively, the field of view may include a wider region, for example completely surrounding the user. The cameras may include stereo cameras from which the AR system can derive, using stereo matching, depth information indicating distances to objects in the environment. The sensor(s) 102 may alternatively, or additionally, include for example, depth sensors for generating depth information, an infrared camera, a sonar transceiver, a LiDAR system, a RADAR system, and so forth.

The sensors 102 may also include position sensors for determining a location and/or orientation (referred to collectively as a position or pose) of the user of the AR system 100. The position sensors may include a global positioning system (GPS) module, one or more accelerometers, one or more gyroscopes, and/or a Hall effect magnetometer for determining orientation (an electronic compass), for example, included in an IMU.

The AR system 100 includes storage 104 for storing sensed data 106 generated by the one or more sensors 102. The storage 104 may be embodied as any suitable combination of non-volatile and/or volatile storage. For example, the storage 104 may include one or more solid-state drives (SSDs), along with non-volatile random-access memory (NVRAM), and/or volatile random-access memory (RAM), for example, static random-access memory (SRAM) and dynamic random-access memory (DRAM) Other types of memory can be included, such as removable storage synchronous DRAM, and so on.

The AR system 100 also includes one or more communication modules 108 for transmitting localization data 110 to be used in localization of the AR system 100. For example, the communication module(s) 108 may transmit localization data 110 to one or more remote computing devices implementing an AR cloud which provides localization functions to identify the position and orientation of the AR system 100 within an environment. Alternatively, the remote computing device may forward the localization data 110 to one or more further remote computing devices implementing an AR cloud.

The communication module(s) 108 may be arranged to transmit the localization data 110 over any suitable wireless communication type. For example, the communication module(s) 108 may use any of Wi-Fi Bluetooth®, infrared, cellular frequency radio waves, or any other suitable wireless communication type. Alternatively, or additionally, the communication module(s) 108 may be arranged to transmit data over a wired connection.

The AR system 100 comprises one or more processors 112. The processor(s) 112 may include various processing units including a central processing unit (CPU), a graphics processing unit (GPU) and/or a specialist neural processing unit (NPU) for efficiently performing neural network operations. According to the present disclosure, neural networks may be used for certain tasks including object detection, as will be described in more detail hereafter. The one or more processors 112 may include other specialist processing units, such as application specific integrated circuits (ASICs), digital signal processors (DSPs), or field programmable gate arrays (FPGAs).

The storage 104 holds machine-readable instructions in the form of program code 114 which, when executed by the one or more processors 112, cause the AR system 100 to perform methods as described hereinafter. The storage 104 is also arranged to store further data for use in performing said methods. The further data in this example includes the sensed data 106 generated by the one or more sensors 102.

It will be appreciated, that the AR system 100 may comprise other components not shown in FIG. 1, for example a user interface used to provide an AR experience to a user of the AR system 100. A user interface may comprise any suitable combination of input and output devices. Input devices include, for example, touch screen interfaces for receiving input from a user, actuatable buttons for receiving an input from a user, sensors, such as motion sensors or microphones adapted to sense an input from a user. Output devices may include displays, such as touch screen displays, speakers, haptic feedback devices, and so forth.

Figure 2:
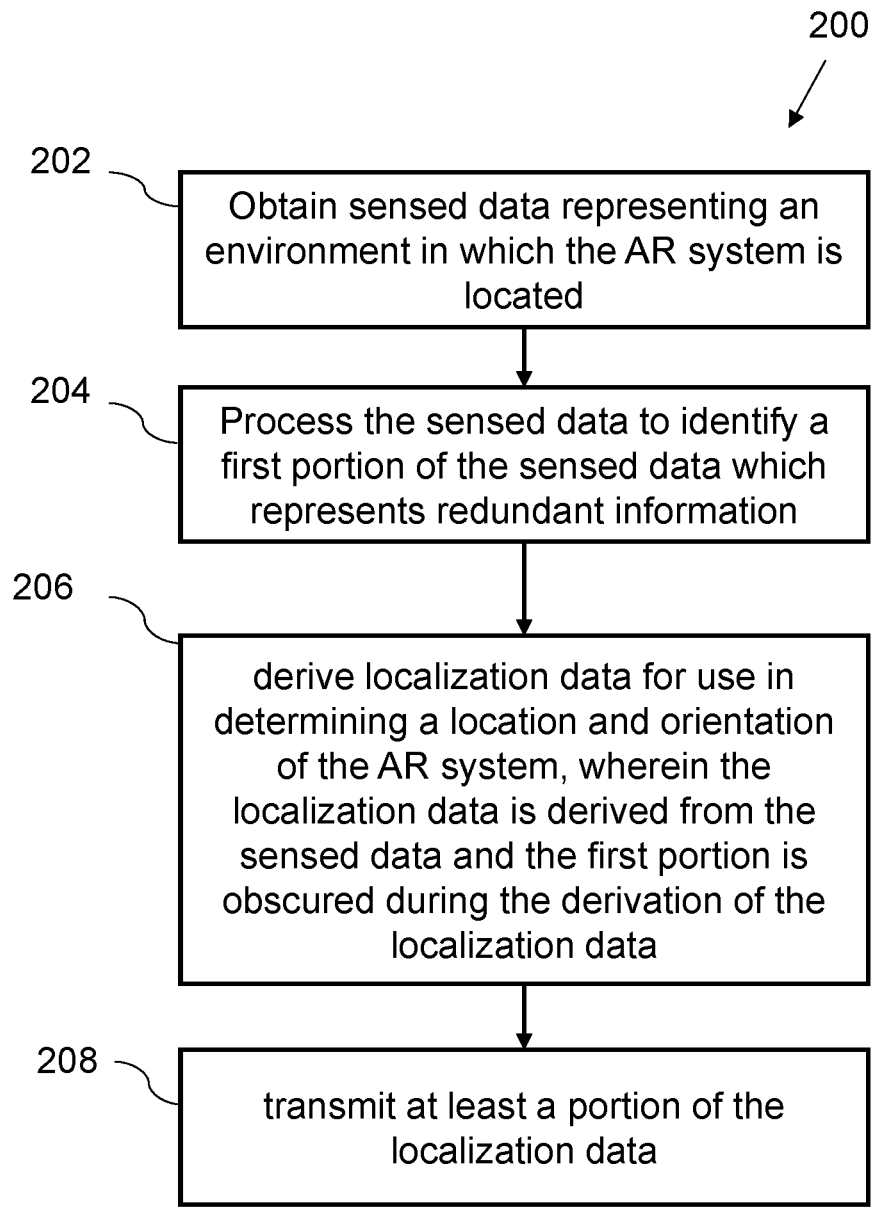
FIG. 2 shows a flow diagram illustrating a computer-implemented method of data processing for an augmented reality system according to examples.

FIG. 2 shows an example of a method 200 performed by the AR system 100 in accordance with the present disclosure. It will be appreciated that while the method 200 is described in relation to the AR system 100, the same method 200 can be performed by any suitable AR system which is arranged to provide an AR experience to a user and which performs localization by transmitting localization data 110 to one or more remote computing devices for determining the location and orientation of the AR system, for example, by relating localization data generated by the AR system 100 to data comprised in an AR cloud.

The AR system 100 obtains, at a first block 202, sensed data 106 representing an environment in which the AR system 100 is located. Obtaining the sensed data 106 may include accessing one or more portions of the storage 104 on which the sensed data 106 is stored. In some examples, the sensed data 106 is generated by the one or more sensors 102 and directly stored on the storage 104. Alternatively, or additionally, at least a portion of the sensed data 106 may be generated by the one or more sensors 102 and processed before being stored on the storage 104. For example, data generated by an image sensor may represent light intensity values generated based on light captured at a plurality of pixel sensors comprised in the image sensor. This data may be processed to generate image data representing an image of the environment. Alternatively, the sensed data 106 may be streamed directly from the one or more sensors 102.

The AR system 100 processes, at block 204, the sensed data 106 to identify a first portion of the sensed data 106 which represents redundant information. When generating sensed data 106 using the one or more sensors 102, redundant information relating to the environment may be collected. Redundant information includes information which is not to be used for determining a location and orientation of the AR system 100. Redundant information may include information relating to one or more dynamic objects, for example objects which are located in and move through the environment. Alternatively, or additionally, redundant information may relate to sensitive information, for example, where the sensed data 106 comprises image data representing an image of an environment, sensitive information may include representations of people, specific parts of people, such as their faces, their clothes, identity cards worn by said people, objects in the environment, for example, credit cards, sensitive information displayed on a digital display, such as a computer monitor or television unit, information such as text printed on paper, and so on. In these cases, processing the sensed data 106 to identify the first portion of sensed data 106 representing redundant information comprises identifying parts of the image data representing one or more objects in the image of the environment. Where the sensed data 106 comprises audio data generated by a microphone in the AR system 100, redundant information may include the speech of one or more people in the environment, for example when reading out credit card details, and so on. Depth or positional information, represented by sensed data 106 generated from sensors such as depth sensors, sonar, RADAR, LiDAR, and so on, may be redundant in nature if it relates to objects in the environment which are dynamic or the arrangement and position of said objects within the environment is confidential.

What is deemed as sensitive information may vary depending on the environment in which the AR system 100 is being used and the type of sensed data 106 which is being processed. For example, where the AR system 100 is being used in a manufacturing context, to aid in the designing and/or building of products, objects in the environment in which the AR system 100 is operating may be of a confidential nature, for example, relating to business secrets, unreleased products, and confidential intellectual property. In high security environments, such as military or government buildings or facilities, a higher degree of sensitivity may be assigned to objects which would otherwise not be considered sensitive.

Processing the sensed data 106 to identify a first portion of the sensed data 106 which represents redundant information may include using one or more object recognition (or "object detection", "object identification", "object classifier", "image segmentation") algorithms. These algorithms are configured to detect instances of objects of a certain class in the real-world environment, e.g. image/audio representations thereof which are represented by the sensed data 106, and the location of the redundant information within the sensed data, for example, the location of the instances of the objects in an image. The one or more object recognition algorithms which are used may be implemented for other purposes in the AR system 100. For example, one or more of the object recognition algorithms may also be used in other processes to understand the environment in which the AR system 100 is located. In this case, the output of these processes may be used for the method 200 described herein, which allows the method 200 to be performed without substantially increasing the amount of processing performed by the AR system 100.

Where the predetermined class is human faces, the object recognition algorithms may be used to detect the presence of a human face in an image represented by image data comprised in the sensed data. In some cases, one or more object recognition algorithms may be used to identify a particular instance of the object. For example, the instance may be a particular human face. Other examples of such object recognition include recognizing, or detecting, instances of expressions (e.g. facial expression), gestures (e.g. hand gesture), audio (e.g. recognizing one or more particular sounds in an audio environment), heat signatures (e.g. recognizing objects such as faces in an infrared representation or "heatmap"). Thus, in examples, the type of "object" being detected may correspond with the type of representation of the real-world environment. For example, for a visual or image representation of the real-world environment, the object recognition may involve recognizing particular articles, expressions, gestures, etc. whereas for an audio representation of the real-world environment the object recognition may involve recognizing particular sounds or sources of sound. In some examples, the object recognition may involve detecting a motion of a recognized object. For example, as well as recognizing an instance of a particular type of object, e.g. a car in the audio/visual representation of the real-world environment, object recognition may also detect or determine a motion of the instance of the object, e.g. the recognized car.

In examples, processing the sensed data 106 to identify a first portion of the sensed data representing redundant information may comprise implementing a support vector machine (SVM) or neural network to perform object recognition, though may other types of object recognition methods exist.

A neural network typically includes several interconnected neurons forming a directed, weighted graph in which vertices (corresponding to neurons) or edges (corresponding to connections) of the graph are associated with weights, respectively. The weights may be adjusted throughout training of the neural network for a particular purpose, altering the output of individual neurons and hence of the neural network as a whole. In a convolutional neural network (CNN), a fully connected layer typically connects to every neuron in one layer to every neuron in another layer. Fully connected layers may therefore be used to identify overall characteristics of an input, such as whether an object of a particular class, or a particular instance belonging to the particular class, is present in an input (e.g. image, video, sound) as part of an object classification process.

A neural network may be trained to perform object detection, image segmentation, sound/speech recognition etc. by processing sensed data, for example to determine whether an object of a predetermined class of objects is present in the real-world environment represented by the sensed data. Training the neural network in this way may generate one or more kernels associated with at least some of the layers (such as layers of the neural network other than the input and output layers). Hence, the output of the training may be a plurality of kernels being associated with a predetermine neural network architecture (for example with different kernels being associated with different respective layers of a multi-layer neural network architecture). The kernel data may be considered to correspond to weight data representative of weights to be applied to image data, as each element of a kernel may be considered to correspond to a weight, respectively. Each of these weights may be multiplied by a corresponding pixel value of an image patch, to convolve the kernel with the image patch as described above.

The kernels may allow features of the input to the neural network to be identified. For example, in the case of image data, some of the kernels may be used to identify edges in the image represented by the image data and others may be used to identify horizontal or vertical features in the image (although this is not limiting, and other kernels are possible). The precise features that the kernels are trained to identify may depend on the image characteristics, such as the class of objects, that the neural network is trained to detect. The kernels may be of any size. A kernel may sometimes be referred to as a "filter kernel" or a "filter". A convolution generally involves a multiplication operation and an addition operation, sometimes referred to as a multiple-accumulate (or "MAC") operation. Thus, a neural network accelerator configured to implement a neural network, may include a multiplier-accumulator (MAC) unit configured to perform these operations.

After the training phase, the neural network (which may be referred to as a trained neural network) can be used to detect the presence of objects of a predetermined class of objects, e.g. in input images. This process may be referred to as a "classification" or "inference". Classification typically involves convolution of the kernel obtained during the training phase with portions of the sensor-originated input, e.g. image patches of an image input to the neural network, to generate a feature map. The feature map may then be processed using at least one fully connected layer, e.g. to classify the object; although other types of processing may be performed.

Where bounding boxes, for example identifying the position of a detected object in an image, are generated using a Regional Convolutional Neural Network (R-CNN), the processing may first include using CNN layers followed by a Region Proposal Network (RPN). In examples where a CNN is used to perform image segmentation, such as using a Fully Convolutional Neural Network (FCN), the processing may include using a CNN followed by deconvolutional layers (i.e. transposed convolution), followed by up sampling.

Returning to the method 200 of FIG. 2, at a third block 206, the AR system 100 derives localization data 110 for use in performing determining a location and orientation of the AR system 100. The localization data 110 is derived from the sensed data 106 and the first portion is obscured during the derivation of the localization data. The first portion of sensed data 106 may be obscured in a number of ways, for example, values represented by the first portion of sensed data 106 may be modified during the derivation of the localization data 110. In other examples, the localization data 110 may be derived from a second portion of the sensed data 106, which is different to the first portion of sensed data 106 and obscuring the first portion may include excluding the first portion from the derivation of the localization data 110. Obscuring the first portion of data is performed in such a way that it does not include, and it is not possible to determine, the redundant information.

In an example, the localization data 110 comprises image data, derived from the sensed data 106, representing at least part of the environment. In this case, deriving the localization data 110 may comprise modifying image data included in the sensed data 106. For example, one or more segmentation masks, associated with one or more objects in an image, may be used to identify the first portion of sensed data 106 and the first portion may then be modified such that it no longer represents redundant information. Modifying in this context may relate to modifying pixel intensity values represented by the first portion. Alternatively, or additionally, modifying may comprise removing, or deleting, the first portion when deriving the localization data 106. The one or more segmentation masks may be generated based on the object recognition methods described above. The one or more segmentation masks delimit the representation of the one or more objects in the image and identify portions of the image data which represent these objects. Alternatively, where the localization data 110 comprises image data, derived from image data included in the sensed data, deriving the localization data may include selecting a second portion of the sensed data to be the localization data 110, which does not include the first portion.

The AR system 100 transmits, at a fourth block 208, at least a portion of the localization data 110 using the one or more communication modules 108, for example, to one or more remote computing devices which comprise, or implement, an AR cloud, for performing localization of the AR system 100. As the first portion of sensed data 106 is obscured during the derivation of the localization data 110, it is possible to prevent redundant information, such as sensitive information, from being transmitted to the one or more remote computing devices. In this way, where the redundant information comprises sensitive information, the method 200 may prevent the localization data 110 from being used to determine sensitive information about the environment in which the AR system is located 110. In some cases, it may be possible for certain entities to intercept communications from the AR system 100 to the one or more remote computing devices, in this case, any communications which may be intercepted do not comprise data which can be used to determine the sensitive information. In some cases, the one or more computing devices which comprise, or implement, the AR cloud may be provided and/or managed by a plurality of service providers, and so restricting access to data which can be used to determine sensitive information is desirable.

Figure 3:
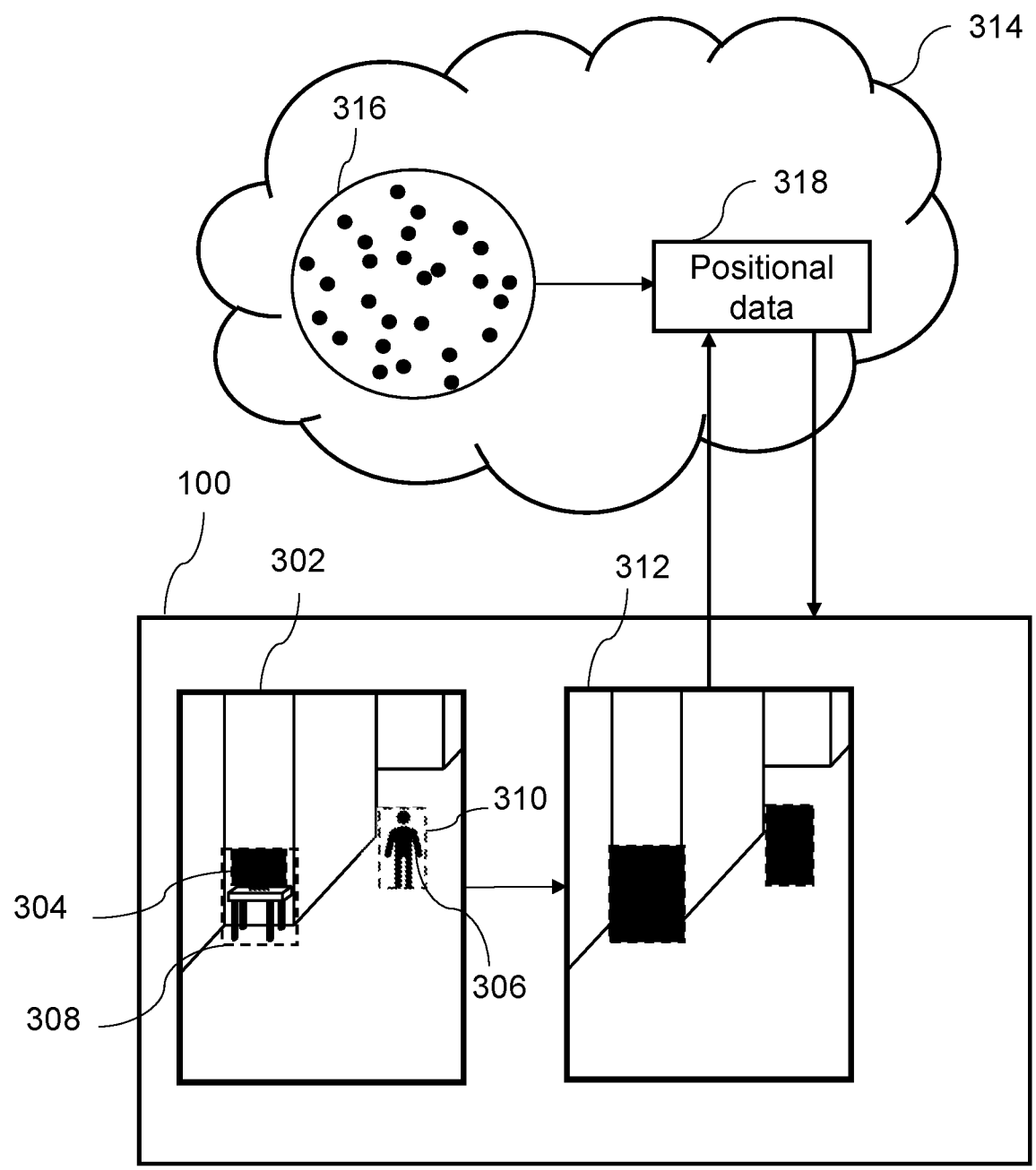
FIG. 3 shows schematically an example of an augmented reality system implementing a method according to examples.

FIG. 3 shows an AR system 100 having obtained sensed data 302 which includes image data representing an image of the environment. The AR system 100 processes the image data to identify two objects 304 and 306 in the image which are represented by a first portion of the sensed data 302. The AR system 100 generates segmentation masks 308 and 310 associated with the two objects 304 and 306. In this case, the segmentation masks 308 and 310 represent portions of the image encompassing the objects 304 and 306. The AR system 100 derives localization data 312, which includes image data, from the sensed data 302. The first portion of sensed data 302, which is image data representing the one or more objects 304, is excluded in the localization data 312. However, it will be appreciated that in some examples, supplemental data, representing the portions of the image where the objects 304 and 306 are located may be provided in the localization data 312. For example, a label may be provided indicating that these portions of the image are restricted and so are not shown.

In some cases, subsequent to transmitting the localization data 312, further localization data may be generated and transmitted. In this case, where the one or more objects 304 and 306 are dynamic objects, which move between frames of captured image data, subsequent localization data may include image data representing these portions of the image such that accurate localization may be still performed based on these areas of the environment. By excluding data representing redundant information in the localization data 312, the amount of data which is transmitted may be reduced, allowing faster communication between the AR system 100 and the one or more remote computing devices 314 and also increasing the efficiency of determining the location and orientation of the AR device 100 as less data, which is not relevant for localization, is processed using the AR cloud.

While in this example the segmentation masks 308 and 310 represent bounding boxes encompassing each of the detected objects 304 and 306, in other examples the segmentation masks 308 and 310 represent portions of the image which are the same size and shape as the detected objects 304 and 306. In some cases, identifying a portion of the sensed data 302 which represents portions of the image which are the same size and shape as the detected objects may be sufficient for removing redundant information. In other cases, the shape and size of the objects themselves may be sensitive in nature and so by identifying a portion of data which encompasses and obscures the shape of the objects 304 and 306, information relating to the size and shape of the objects 304 and 306 may not be included in the localization data 312. While bounding boxes have been used to represent the segmentation masks 308 and 310 in the present example, it will be appreciated that other shapes of segmentation mask 308 and 310 may be used including regular and non-regular polygons, curved shapes, and any other suitable shape. In some case, the size and shape of the one or more segmentation masks 308 and 310 which are used may be dependent on the class of object 304 and 306 which has been detected in the image. Dynamic objects captured in images may also affect the accuracy of determining the location and orientation (or "geopose determination"), and so by excluding data representing these objects, the accuracy of the geopose determination may be increased.

The AR system 100 transmits at least a portion of the localization data 312 for receipt by one or more remote computing devices 314 which implements an AR cloud 314. The one or more remote computing devices 314 comprise a point cloud 316 representing a real-time spatial map of a real-world environment, including the environment in which the AR system 100 is located. This point cloud 316 is used conjunction with the localization data 312 to determine the location and orientation of the AR system 100. The AR system may then receive positional data 318 representing the location and orientation of the AR system 100 from the one or more remote computing devices 314.

In some examples, the localization data 312 comprises metadata identifying the parts of the image which represent the one or more objects 304 and 306 in the image. By identifying the parts of the image which represent the one or more objects 304 and 306 in the image within the localization data, the one or mote remote computing devices 314 may be informed of a portion of the image data included in the localization data which are not to be processed. Hence the remote computing device(s) 314 may avoid wasting computing resources in attempting to process these parts of the data and/or may use this information to ensure that these portions of data do not affect the resultant determination of the AR system's 100 location and orientation.

Figure 4:
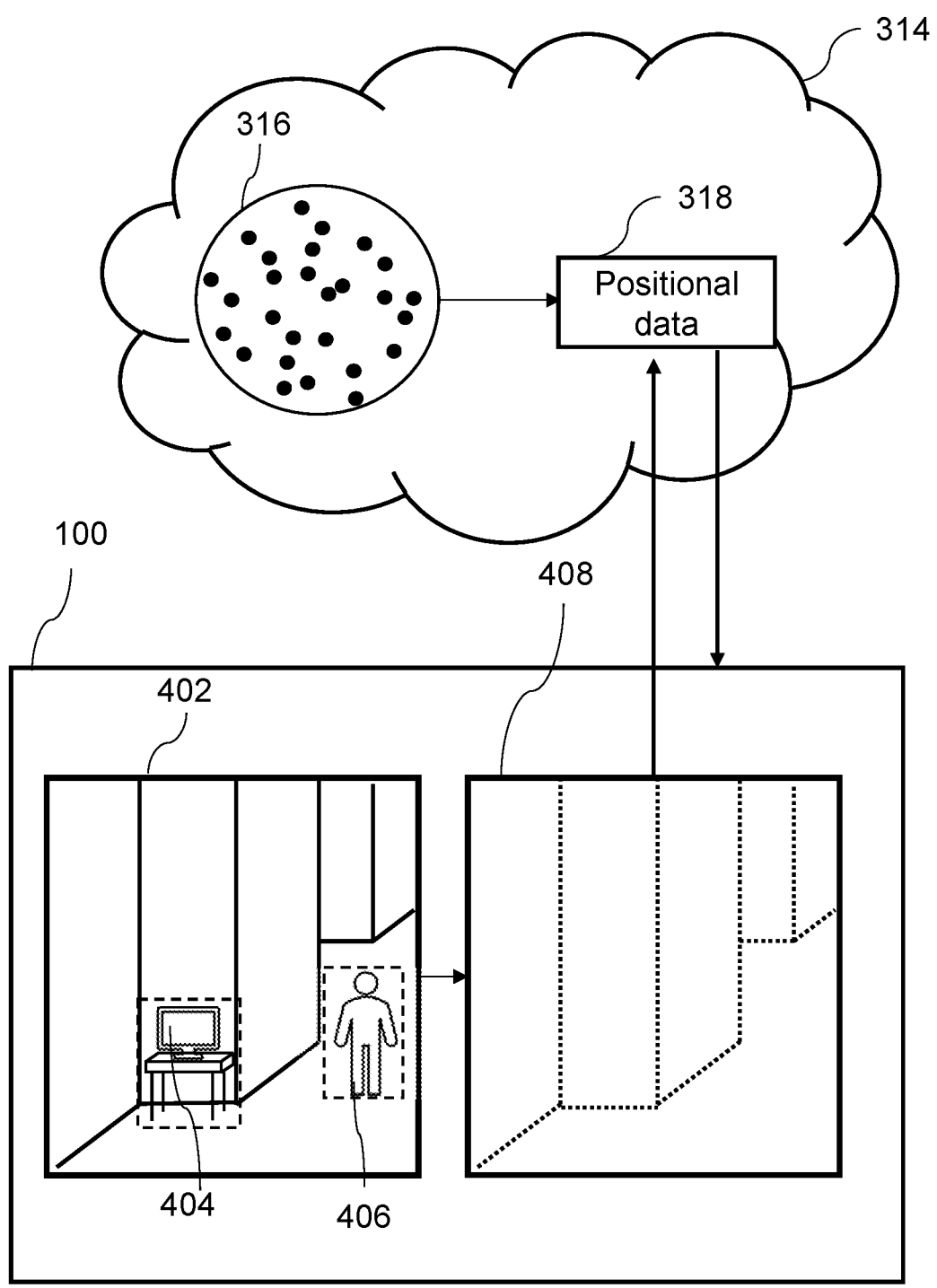
FIG. 4 shows schematically an example of an augmented reality system implementing a method according to examples.

As described above, the localization data 110 may alternatively, or additionally, comprise other data aside from image data. FIG. 4 shows an example in which the AR system 100 obtains sensed data 402 including image data representing an image of the environment. The AR system 100 processes the image data to identify one or more objects 404 and 406 which are represented by a first portion of the sensed data 402. The AR system 100 derives localization data 408 which includes data representing a group of one or more feature points generated using the image data. At least a portion of the localization data 408 representing at least a portion of the one or more feature points is then transmitted. Feature points may include, for example, edges, corners, blobs, ridges, and other relevant features in the image. Generating feature points from an image may comprise using one or more feature detection algorithms, for example, scale-invariant feature transform (SIFT), features from accelerated segment test (FAST), local binary patterns (LBP), and other known feature detection algorithms. In some examples, the feature points are associated with respective feature descriptors and said feature descriptors may be included in the localization data 408.

Although feature points and descriptors do not include image data representing an image of the environment, in some cases, it may be possible to process data representing feature points and descriptors to identify redundant information, for example, by a process of feature inversion. In this case, providing localization data 408 which does not include data representing feature points which are associated with redundant information, can inhibit, or prevent, the reconstruction of original images including the redundant information.

In some examples, deriving the localization data 408 may comprise processing a second portion of the sensed data 402, which does not include the first portion of sensed data 402, to generate the group of one or more feature points. Alternatively, the localization data 408 may be derived by processing the sensed data 402 to generate the group of one or more feature points, including using the first portion of sensed data 402, and subsequently removing data representing certain feature points from the group of one or more feature points which correspond to the first portion of sensed data 402. In either case, one or more segmentation masks may be generated, as described above, to identify the first portion of sensed data 402.

Figure 5:
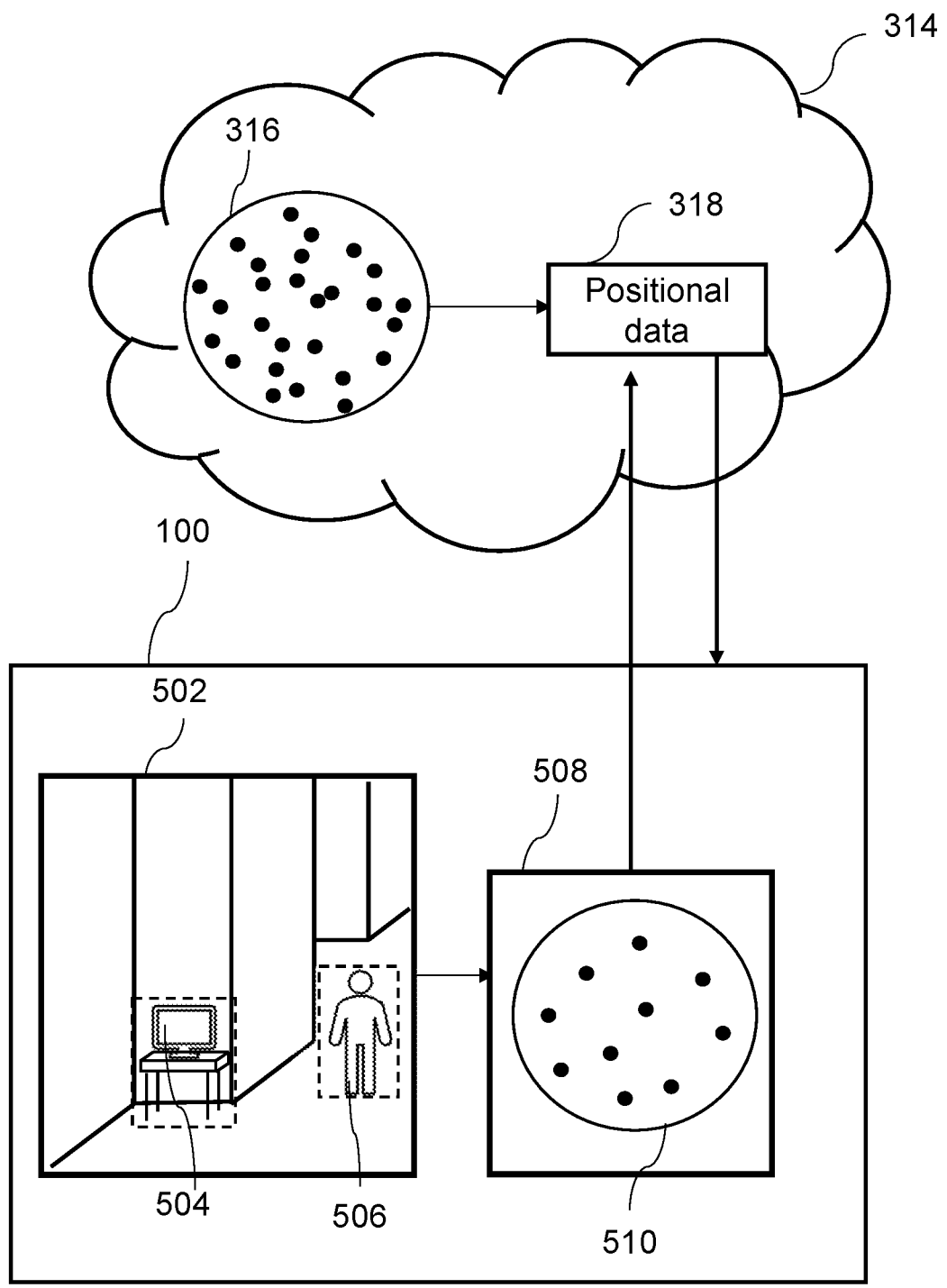
FIG. 5 shows schematically an example of an augmented reality system implementing a method according to examples.

FIG. 5 shows an example in which the AR system 100 obtains sensed data 502 including image data representing an image of the environment. The AR system 100 processes the image data to identify one or more objects 504 and 506 which are represented by a first portion of the sensed data 502. The AR system derives localization data 508 which includes data representing a point cloud 510. A point cloud 510 is a 3D representation of the environment in the form of a plurality of points. At least a portion of the localization data 508, comprising the point cloud 510, is then transmitted to one or more remote computing devices 314 to determine the location and orientation of the AR system 100. In this case, deriving the localization data 508 may comprise generating the data representing the point cloud 510 from a second portion of the sensed data 502 which does not include the first portion. Alternatively, deriving the localization data 508 may comprise generating a point cloud 510 from the sensed data 502, using both the first and second portions of sensed data 502, and subsequently removing data representing points in the point cloud 510 which are generated based on the first portion.

In some examples, the localization data 312, 408, and 508 which is transmitted may comprise a combination of the data described above. For example, the localization data may comprise a combination of image data, features points and descriptors, and/or a point cloud 510.

The sensed data 106 may comprise other combinations of different types of data such as image data and depth data, generated by a depth sensor such a sonar transceiver, a RADAR system, or a LiDAR system and representing the relative positions of one or more objects in the environment. In this case, processing the sensed data 106 may comprise processing the image data to identify one or more objects in the image and identifying a first portion of the sensed data 106 including image data and depth data associated with the one or more objects. The AR system 100 may derive localization data comprising depth data and any of, image data, data representing feature points and descriptors, and/or data representing a point cloud, the first portion of the sensed data being obscured when deriving the localization data 110. For example, depth data representing the depth of the one or more objects which are detected may not be included in the localization data 110.

As described above, the sensed data 106 may comprise audio data representing sounds captured from the environment. In this case, the method may comprise processing the sensed data 106 to identify a first portion of the sensed data 106 representing voices, or the sound made by one or more articles, such as machines, in the environment. Localization data 110 which includes audio data may then be derived in which the first portion of sensed data is obscured, such as by deriving the localization data 110 from a second portion of the sensed data 106 which is different to the first portion of sensed data 106 or by initially deriving localization data from all of the sensed data 106 and subsequently removing parts of the localization data 110 which are derived from the first portion.

Figure 6:
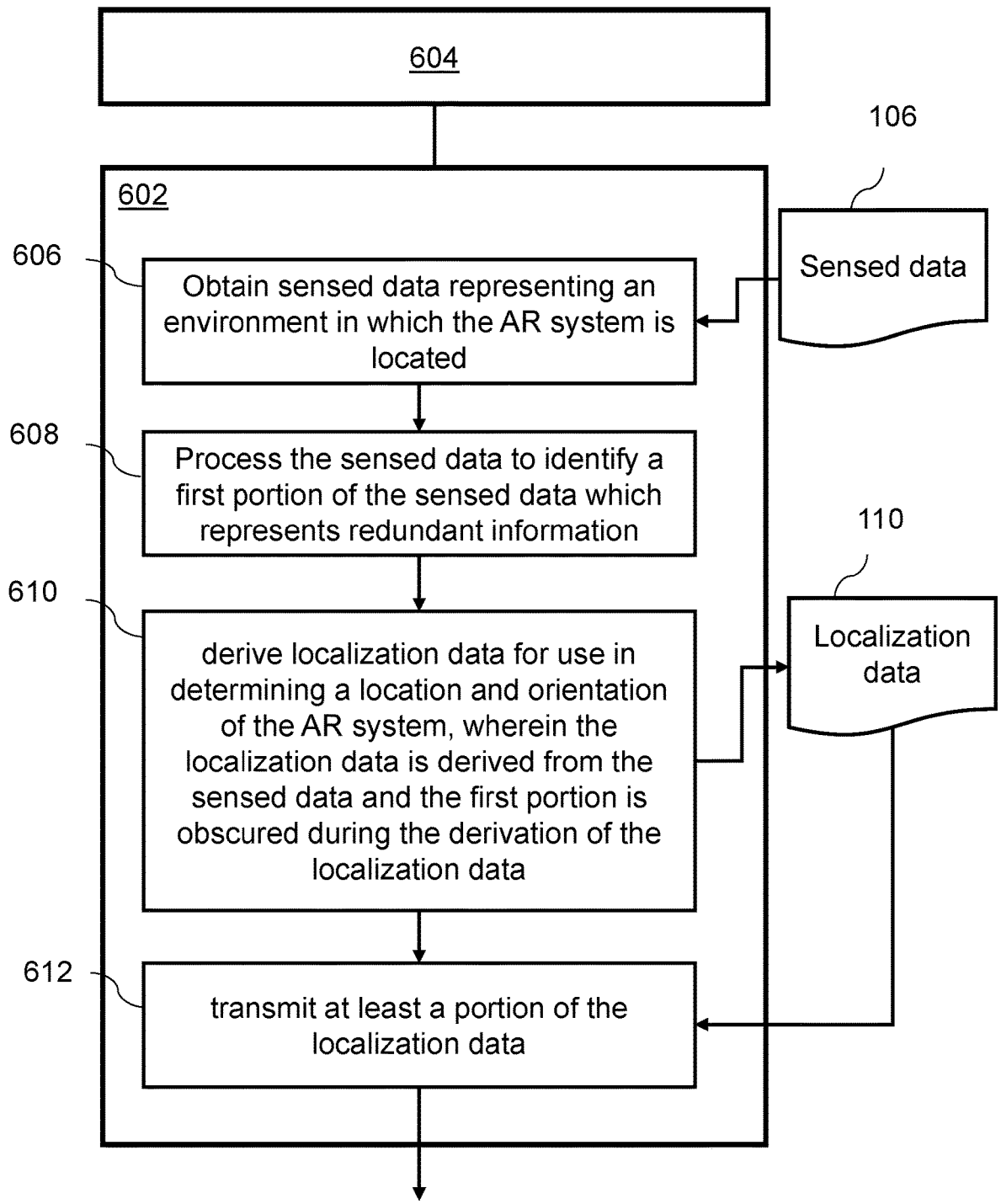
FIG. 6 shows schematically a non-transitory computer-readable storage medium comprising computer-readable instructions, according to examples.

FIG. 6 shows a non-transitory computer-readable storage medium 602 comprising computer-readable instructions 606 to 612 which, when executed by one or more processors 604, cause the one or more processors 604 to execute methods as described above, and shown in the blocks 606 to 612 of FIG. 6. The examples and variations of the method 200 described above in relation to FIGS. 1 to 5 also apply to the computer-readable instructions 606 to 612 included on the computer-readable storage medium 602.

Other examples are also envisaged in which AR systems which perform geopose determination locally may occasionally, or periodically, transmit localization data 110 to one or more remote computing devices in order to verify the accuracy of the geopose determination and in some cases to subsequently correct and/or resynchronize the geopose determination of the AR system. In these cases, the method 200 may be applied such that the localization data 110 which is transmitted does not comprise data representing, or which can be used to determine, redundant information.

It is to be understood that any features described in relation to any one example may be used alone, or in combination with other features described, any may also be used in combination with one or more features of any other examples, or any combination of any other examples. Furthermore, equivalents and modification not described above may also be employed without departing from the scope of the accompanying claims.

What is claimed is:

1. An augmented reality, AR, system comprising:
   one or more sensors arranged to generate sensed data representing at least part of an environment in which the AR system is located;
   storage for storing sensed data generated by the one or more sensors;
   one or more communication modules for transmitting localization data to be used in determining a location and orientation of the AR system; and
   one or more processors arranged to:
      obtain sensed data representing the environment in which the AR system is located;
      process the sensed data to identify a first portion of the sensed data which represents sensitive information relating to objects in the environment, wherein the objects include an object which is assigned a degree of sensitivity which varies in dependence on the environment, and whether information relating to the object is deemed to be in the first portion depends on the degree of sensitivity assigned to the object in the environment in which the object is located;
      derive localization data for use in determining a location and orientation of the AR system, wherein the localization data is derived from the sensed data and the first portion is obscured during the derivation of the localization data; and
      transmit at least a portion of the localization data using the one or more communication modules.

2. The AR system of claim 1, wherein the localization data is derived from a second portion of the sensed data which is a different portion than the first portion and obscuring the first portion of sensed data comprises excluding the first portion of sensed data during the derivation of the localization data.

3. The AR system of claim 1, wherein the one or more processors are arranged to receive positional data representing a location and orientation of the AR system with respect to the environment.

4. The AR system of claim 1, wherein the one or more sensors comprise any of:
   an image sensor;
   a microphone;
   a depth sensor;
   a sonar transceiver;
   a Light Detection And Ranging, LiDAR, sensor; and
   a Radio Azimuth Direction And Ranging, RADAR, sensor.

5. The AR system of claim 1, wherein the sensed data comprises image data representing an image of the environment, and processing the sensed data to identify the first portion of sensed data comprises identifying parts of the image data representing one or more objects in the image.

6. The AR system of claim 5, wherein the at least a portion of the localization data which is transmitted comprises metadata identifying the parts of the image which represent the one or more objects.

7. The AR system of claim 5, wherein processing the sensed data to identify the first portion of sensed data comprises processing the image data to generate one or more segmentation masks associated with the one or more objects in the image, the one or more segmentation masks identifying the first portion of the sensed data.

8. The AR system of claim 7, wherein the one or more segmentation masks are generated by processing the image data using a neural network to identify the one or more objects in the image of the environment.

9. The AR system of claim 7, wherein the segmentation mask represents a portion of the image encompassing the one or more objects in the image.

10. The AR system of claim 5, wherein the at least a portion of the localization data which is transmitted using the one or more communication modules comprises any of:
data representing a group of one or more feature points generated using the image data; and
data representing a point cloud generated using the image data.

11. A computer-implemented method of data processing for an augmented reality, AR, system, the method comprising:
obtaining sensed data representing an environment in which an AR system is located;
processing the sensed data to identify a first portion of the sensed data which represents sensitive information relating to objects in the environment, wherein the objects include an object which is assigned a degree of sensitivity which varies in dependence on the environment, and whether information relating to the object is deemed to be in the first portion depends on the degree of sensitivity assigned to the object in the environment in which the object located;
deriving localization data for use in determining a location and orientation of the AR system, wherein the localization data is derived from the sensed data and the first portion is obscured during the derivation of the localization data; and
transmitting at least a portion of the localization data.

12. The computer-implemented method of claim 11, wherein the localization data is derived from a second portion of the sensed data which is a different portion than the first potion and obscuring the first portion of sensed data comprises excluding the first portion of sensed data during the derivation of the localization data.

13. The computer-implemented method of claim 11, comprising receiving positional data representing a location and orientation of the AR system with respect to the environment.

14. The computer-implemented method of claim 11, wherein the sensed data comprises image data representing an image of the environment and processing the sensed data to identify the first portion of sensed data comprises identifying parts of the image data representing one or more objects in the image.

15. The computer-implemented method of claim 14, wherein the at least a portion of the localization data which is transmitted comprises metadata identifying the parts of the image which represent the one or more objects.

16. The computer-implemented method of claim 14, wherein processing the sensed data to identify the first portion of sensed data comprises processing the image data to generate one or more segmentation masks associated with the one or more objects in the image, the one or more segmentation masks identifying the first portion of the sensed data.

17. The computer-implemented method of claim 16, wherein the one or more segmentation masks are generated by processing the image data using a neural network to identify the one or more objects in the image of the environment.

18. The computer-implemented method of claim 16, wherein the one or more segmentation masks represents a portion of the image encompassing the one or more objects.

19. The computer-implemented method of claim 14, wherein the at least a portion of the localization data which is transmitted comprises any of:
data representing feature points generated using the image data; and
data representing a point cloud generated using the image data.

20. A non-transitory computer-readable storage medium, comprising computer-readable instructions which, when executed by at least one processor, cause the at least one processor to:
obtain sensed data representing an environment in which an augmented reality, AR, system is located;
process the sensed data to identify a first portion of the sensed data which represents sensitive information relating to objects in the environment, wherein the objects include an object which is assigned a degree of sensitivity which varies in dependence on the environment, and whether information relating to the object is deemed to be in the first portion depends on the degree of sensitivity assigned to the object in the environment in which the object is located;
derive localization data for use determining a location and orientation of the AR system, wherein the localization data is derived from the sensed data and the first portion is obscured during the derivation of the localization data; and
transmit at least a portion of the localization data.

* * * * *